(12) United States Patent
Metzger

(10) Patent No.: US 8,381,367 B2
(45) Date of Patent: Feb. 26, 2013

(54) BELT HOLDER DEVICE

(75) Inventor: Frank Metzger, Albstadt (DE)

(73) Assignee: BAG Bizerba Automotive GmbH, Balingen (DE)

( * ) Notice: Subject to any disclaimer, the term of this patent is extended or adjusted under 35 U.S.C. 154(b) by 0 days.

(21) Appl. No.: 13/186,524

(22) Filed: Jul. 20, 2011

(65) Prior Publication Data

US 2011/0277281 A1 Nov. 17, 2011

Related U.S. Application Data

(63) Continuation of application No. PCT/EP2010/050767, filed on Jan. 25, 2010.

(30) Foreign Application Priority Data

Jan. 28, 2009 (DE) .......................... 10 2009 007 720

(51) Int. Cl.
*B60R 22/18* (2006.01)
(52) U.S. Cl. ................ 24/182; 24/194; 24/196; 24/197; 24/265 BC; 280/806
(58) Field of Classification Search ............ 24/200, 24/182, 633, 163 R, 265 BC, 265 EC, 662; 280/801.1, 808, 806; *B60R 22/18*
See application file for complete search history.

(56) References Cited

U.S. PATENT DOCUMENTS

| | | | | |
|---|---|---|---|---|
| 5,960,523 A | * | 10/1999 | Husby et al. | 24/633 |
| 5,996,421 A | * | 12/1999 | Husby | 73/862.451 |
| 6,081,759 A | * | 6/2000 | Husby et al. | 701/45 |
| 6,230,088 B1 | * | 5/2001 | Husby | 701/45 |
| 6,357,091 B1 | * | 3/2002 | Devereaux | 24/633 |
| 6,454,304 B1 | | 9/2002 | Steffens, Jr. | |
| 6,554,318 B2 | * | 4/2003 | Kohut et al. | 280/801.1 |
| 6,729,194 B2 | | 5/2004 | Kaijala et al. | |
| 6,776,056 B2 | * | 8/2004 | Garver et al. | 73/862 |

(Continued)

FOREIGN PATENT DOCUMENTS

| | | |
|---|---|---|
| DE | 100 50 551 | 6/2001 |
| DE | 103 22 700 | 2/2004 |

(Continued)

OTHER PUBLICATIONS

English translation of the International Report on patentability for International Patent Application PCT/EP2010/050767 (mailed Aug. 11, 2011).

(Continued)

*Primary Examiner* — Robert J Sandy
*Assistant Examiner* — Louis Mercado
(74) *Attorney, Agent, or Firm* — Leydig, Voit & Mayer, Ltd.

(57) ABSTRACT

A belt holder device is provided having a housing having a first fixing device, a plate having a second fixing device mounted on the housing for displacement in a displacement direction, wherein the belt holder device is held on an application via one fixing device and a belt is held on the other fixing device, a transmitter-sensor device arranged in the housing and by which the relative position of the plate to the housing is determinable, and a spring device via which the plate is supported on the housing and which provides a return force, wherein the spring device is formed by a flexural spring device, wherein the transmitter is integrated in the plate, wherein the transmitter is arranged in a recess of the plate, and wherein the transmitter in the recess is a magnet and is surrounded by a magnetically insulating enclosure.

20 Claims, 9 Drawing Sheets

U.S. PATENT DOCUMENTS

| | | | |
|---|---|---|---|
| 6,978,687 B2 * | 12/2005 | Barnabo et al. | 73/862.393 |
| 7,222,545 B2 | 5/2007 | Blakesley et al. | |
| 7,272,979 B2 * | 9/2007 | Kaijala | 73/862.391 |
| 2001/0042981 A1 | 11/2001 | Kohut et al. | |
| 2004/0044455 A1 | 3/2004 | Ante et al. | |
| 2004/0231436 A1 | 11/2004 | Barnabo et al. | |
| 2004/0245761 A1 | 12/2004 | Maloney et al. | |
| 2006/0197520 A1 | 9/2006 | Frank | |
| 2009/0199661 A1 | 8/2009 | Skarpil | |

FOREIGN PATENT DOCUMENTS

| | | |
|---|---|---|
| DE | 10 2006 038 594 | 2/2008 |

OTHER PUBLICATIONS

International Search Report in International Application No. PCT/EP2010/050767 (mailed on Mar. 30, 2010).

* cited by examiner

BELT HOLDER DEVICE

This application is a continuation of international application number PCT/EP2010/050767 filed on Jan. 25, 2010.

The present disclosure relates to the subject matter disclosed in international application number PCT/EP2010/050767 filed on Jan. 25, 2010 and German application number 10 2009 007 720.0 of Jan. 28, 2009, which are incorporated herein by reference in their entirety and for all purposes.

BACKGROUND OF THE INVENTION

The invention relates to a belt holder device comprising a housing having a first fixing device, a plate having a second fixing device and being mounted on the housing for displacement in a displacement direction, wherein the belt holder device is held on an application via one of the fixing devices and a belt is held on the other fixing device, a transmitter-sensor device which is arranged in the housing and by means of which the relative position of the plate to the housing can be determined, and a spring device via which the plate is supported on the housing and which provides a return force.

U.S. Pat. No. 6,729,194 B2 discloses a seat belt tension sensor device including a housing having an interior space. An anchor plate is provided having a recess to which a magnet is fixed, the magnet moving as the anchor plate moves and the magnet further being guided by a carriage mounted on the housing. A magnetic field sensor is mounted on the housing at a position below the carriage, the carriage protecting the sensor.

A further seat belt tension sensor device is known from U.S. Pat. No. 7,222,545 B2.

DE 100 50 551 A1 discloses a device comprising seat belt webbing for restraining an object in a vehicle seat, a sensor associated with the vehicle seat for sensing a sensed weight of the object in the vehicle seat, a seat belt tension sensor for sensing the tension in the seat belt webbing and a control device for determining a computed weight of the object as a function of both the sensed weight and the tension in the seat belt webbing.

DE 103 22 700 A1 discloses a belt buckle housing having an integrated force measuring device for measuring a belt tensile force acting on a belt buckle, including a movable anchor that protrudes through an opening formed in an end wall of the housing and has a stop which restricts the anchor's capability to move out of the housing against an elastic support operating between the housing and the anchor, and a sensor attached to the housing for sensing the position of the movable anchor.

SUMMARY OF THE INVENTION

In accordance with an embodiment of the invention, a belt holder device is provided which is of simple construction.

In accordance with an embodiment of the invention, the belt holder has a spring device which is formed by a flexural spring device and has a transmitter which is integrated in a plate, the transmitter being arranged in a recess of the plate, and the transmitter in the recess is a magnet and is surrounded by a magnetically insulating enclosure.

A flexural spring device can be configured with small dimensions in a direction parallel to the direction of displacement. This enables the flexural spring device to be integrated in the housing in a simple manner. For example, it is possible for it to be supported within a recess of the plate or on a pin element (or the like) that is arranged at the plate. This allows for ease of construction and ease of assembly of the belt holder device during manufacture.

By way of example, it further enables the transmitter-sensor device and in particular a sensor unit to be replaced in a simple manner.

The transmitter-sensor device may in particular be used for determining the belt tension from the relative position of the plate to the housing. The corresponding signal may, for example, be processed further by a superordinate control device.

It is advantageous for the flexural spring device to be formed by a single flexural spring or by a single pack of flexural springs (i.e. from a plurality of flexural springs stacked one above the other). This results in a simple and compact construction.

In particular, the flexural spring device has a flexural axis which is oriented transversely and in particular perpendicularly to the direction of displacement. This allows a returning force for a displacement movement of the plate on the housing to be provided in a simple manner.

For the same reason, it is advantageous for the flexural spring device to have its largest length dimension in a direction transverse to the direction of displacement. This allows the spring device to be integrated in the housing in a simple manner.

It is particularly advantageous for the flexural spring device to have a middle region, a first wing and a second wing, each of the first wing and the second wing being arranged at and being elastically bendable with respect to the middle region. This allows the belt holder device to be constructed in a simple and compact manner. In particular, it is possible for the width of the housing to be oriented in a direction transverse to the direction of displacement.

It is further advantageous for the first wing and the second wing to be arranged and configured symmetrically with respect to the middle region. This enables symmetric load application.

It is advantageous for the flexural spring device to be supported via its middle region on one of the housing and the plate and for the first wing and the second wing to be supported on the other of the housing and the plate. This is a simple way of mounting the flexural spring device and providing the corresponding return force.

The flexural spring device is, for example, made of metal.

It is also possible for the flexural spring device to be made of a plastics material which is in particular fibre reinforced. In this case, the flexural spring device can be easily integrated in the housing which is, in particular, also made of a plastics material.

By way of example, the housing is made of a fibre-reinforced plastics material, wherein the fibres are arranged corresponding to the force biasing. A flexural spring device made of a fibre-reinforced plastics material can then be integrated in a simple manner. It is also possible to have a flexural spring device that is separate from the housing, the flexural spring device being made of a (fibre-reinforced or non fibre reinforced) plastics material. A flexural spring device made of a plastics material can be optimized in terms of its shape. For example, the flexural spring device may be of rectilinear configuration without force biasing or of curved configuration.

It may be provided for the flexural spring device to be integrally formed, and to be in particular integrally formed in one piece, on the housing. This allows the number of components to be reduced further.

It may further be provided for at least one pin element for supporting the flexural spring device to be arranged at the plate.

In a further exemplary embodiment, the plate has a recess, the flexural spring device being supported on a wall delimiting the recess. This results in a compact construction, wherein the height dimensions of the housing can be minimized.

In particular, the housing has a web or a wall on which the flexural spring device is supported. This enables one or more locations of joints to be provided for the spring device in a simple manner.

In an exemplary embodiment, the web extends into a recess of the plate. This allows the height dimensions of the housing to be minimized.

It may be provided for the housing to have a lower housing part and an upper housing part. In particular, it is then possible for the housing parts to be placed on top of one another. This results in a simple and compact construction.

It is particularly advantageous for slide rails for the plate to be integrally formed, and to be in particular integrally formed in one piece, on the lower housing part and/or the upper housing part. Such slide rails can be integrally produced with the corresponding housing part in a simple manner. They can then be used for slidingly guiding the plate in order to implement displaceability thereof relative to the housing.

It is advantageous for the transmitter-sensor device to have at least one magnet as a transmitter and at least one magnetic field sensitive sensor as a sensor. This enables the relative position of the plate to the housing, and in particular the belt tension, to be determined in a non-contact manner.

In particular, the at least one magnet is a bar magnet. Such a bar magnet can be manufactured and integrated in the plate in a simple manner.

It is advantageous for the direction of succession of the bar magnet's north pole and south pole to be at least approximately parallel to the direction of displacement. This results in an optimized magnetic field biasing of a magnetic field sensitive sensor at a high signal level.

It is particularly advantageous for the transmitter to be integrated in the plate. This results in a simple and compact construction while minimizing the components. In particular, there is no need for a separate carrier or carriage to be provided for the transmitter.

In particular, to this end, the transmitter is arranged in a recess of the plate and is seated in particular at least partially and advantageously in particular completely within said recess.

The transmitter may be attached to the recess for example by adhesive bonding or press-fit mounting. This enables easy manufacturability.

It is advantageous for the transmitter in the recess to be a magnet and to be surrounded by a magnetically insulating enclosure. This prevents magnetic short-circuiting and thus weakening of the magnetic field.

It is advantageous for the transmitter to be a magnet and to be of cylindrical or cube-shaped configuration. This enables the transmitter to be manufactured and integrated in the plate in a simple and cost-effective manner.

Preferably, the plate has a top side and a bottom side, the bottom side facing towards the sensor and the transmitter not protruding beyond the top side. This results in a simple and compact construction.

It is further advantageous for the transmitter not to protrude beyond the bottom side. This allows the height dimensions of the housing to be minimized. The transmitter is seated between surfaces (top side and bottom side) of the plate.

In an embodiment, the first fixing device comprises an opening in the housing through which a fastening element can extend, wherein the plate has a corresponding opening having a length in the direction of displacement that is larger than that of the opening in the housing. This enables the plate to be displaceable relative to the housing within a certain range. If the housing is damaged or even destroyed completely, then the plate with the belt fixed thereto is still held on the application.

It may be provided for the fastening element which is adapted to extend through the opening in the housing to have a first area adapted to be positioned in the opening of the housing and a second area provided with a thread, the first area having a larger cross-section than the second area. At the transition from the first area to the second area, a contact face is provided for contact with the application, the contact face defining the screw-in depth of the fastening element.

In particular, the belt holder device in accordance with the invention has a belt holder body which consists of the plate with integrated transmitter, the housing having a lower housing part and an upper housing part and having the sensor arranged thereat, and the flexural spring device. This allows the number of components to be minimized.

The following description of preferred embodiments, taken in conjunction with the drawings, serves to explain the invention in greater detail.

DETAILED DESCRIPTION OF THE INVENTION

Figure 1:
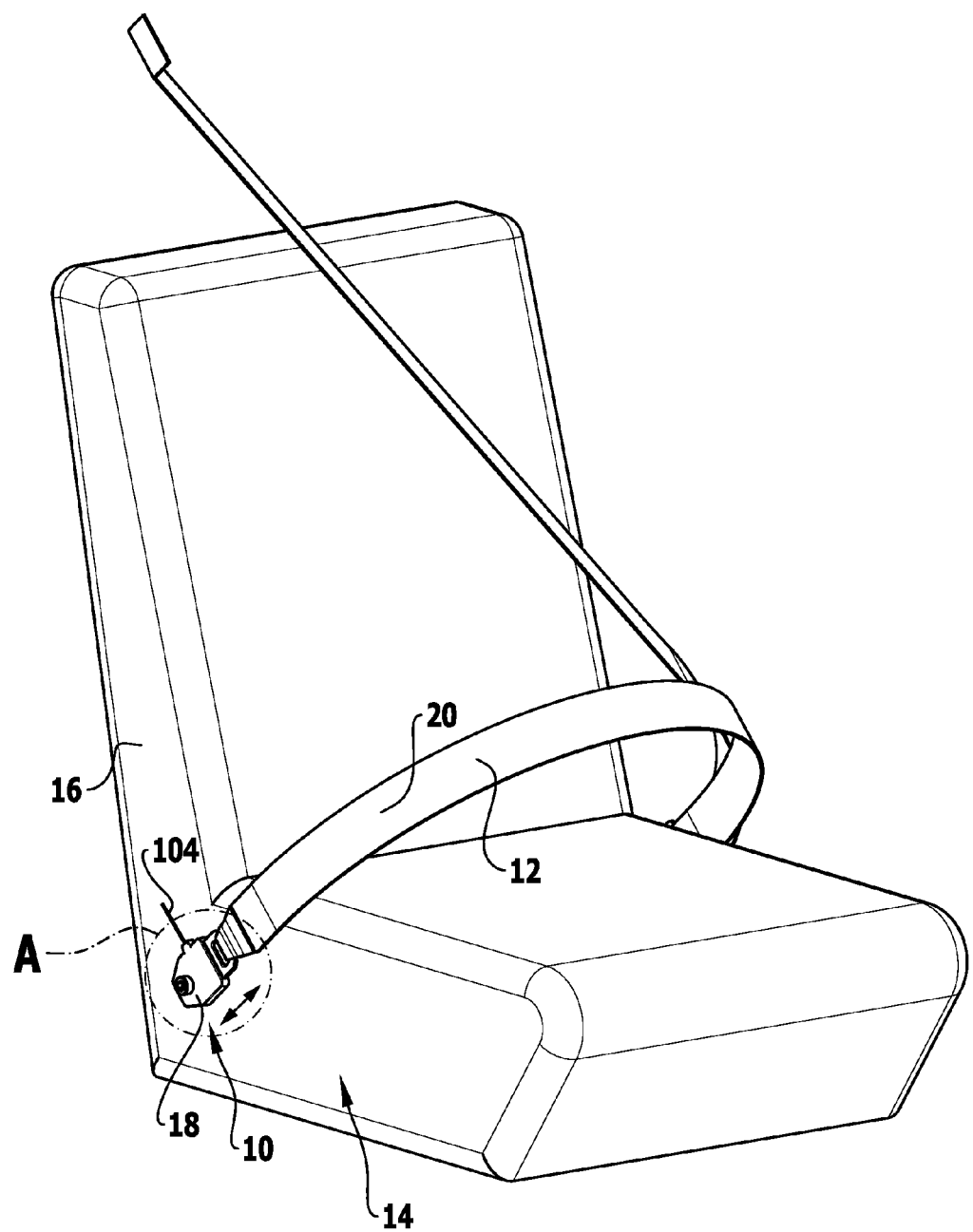
FIG. 1 is a schematic representation of a seat of a motor vehicle with an exemplary embodiment of a belt holder device arranged at the seat.
Figure 2:
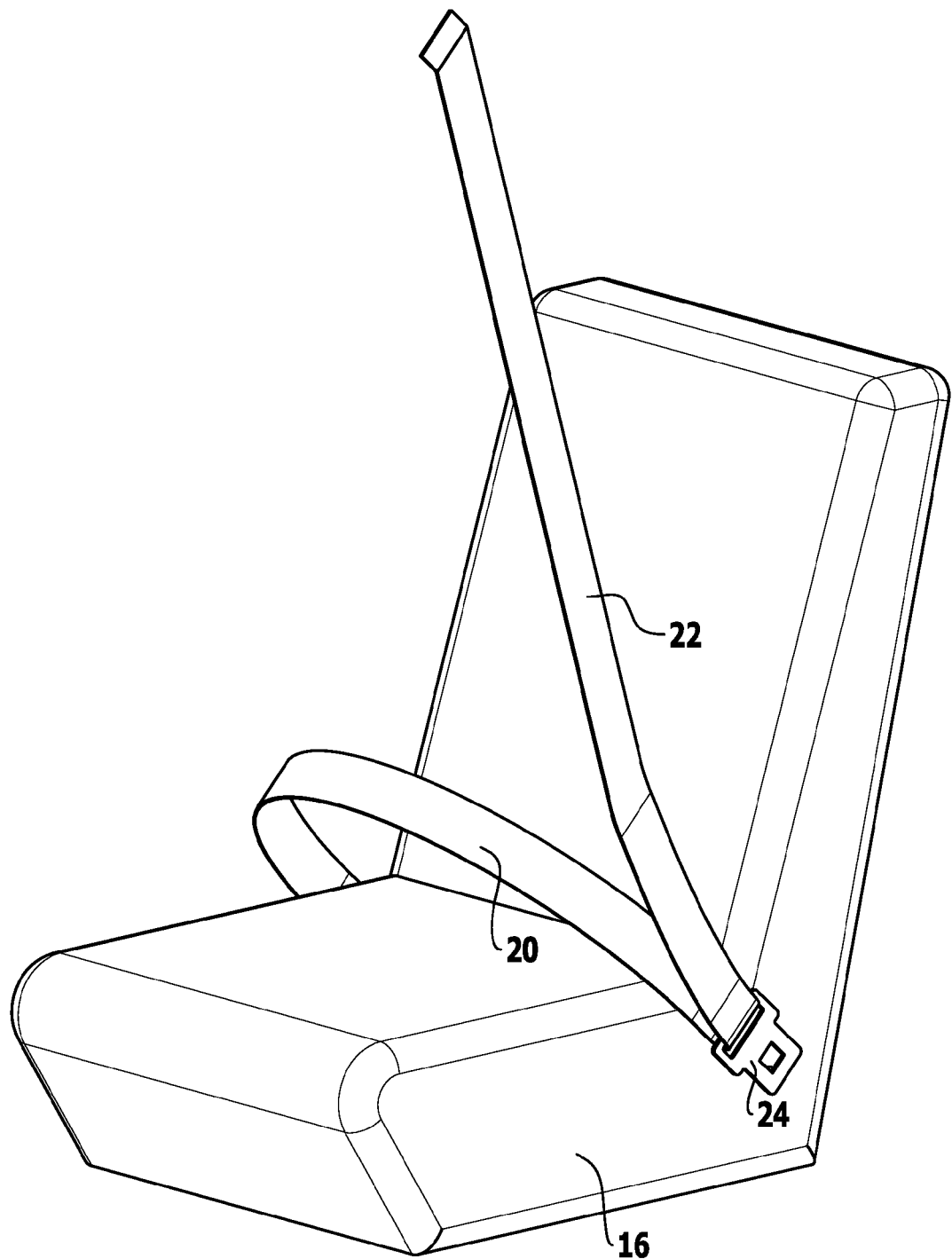
FIG. 2 is a different view of the seat of FIG. 1.

An exemplary embodiment of a belt holder device in accordance with the invention, which is shown in FIGS. 1 and 3 to 7 and indicated therein by 10, serves to hold a belt 12, and in particular a safety belt, on an application 14. The application 14 is, for example, a seat 16 of a vehicle. The belt holder device 10 may be fixed to the seat 16 or, for example, to a floor of the vehicle (not shown in the drawings).

The belt holder device 10 comprises a belt holder body 18. Firmly fixed to the belt holder body 18 is a belt portion 20. The belt portion 20 is, for example, the lap belt. The belt portion 20 is connected to a further belt portion 22 which is, for example, the shoulder belt. Said shoulder belt is, for example, fixed to the B-pillar of the vehicle via a corresponding device.

A (male) connector tongue 24 is positioned for free displacement thereof in the transition area between the belt portion 20 and the belt portion 22. With the connector tongue 24 fixed in a corresponding belt buckle, the belt 12 is fixed to the application 14 via three points (three-point belt), namely to the application via the belt holder device 10, to the belt buckle via the connector tongue 24, and to the B-pillar.

The belt holder body 18 has a housing 26 (FIGS. 3 to 7). The housing 26 is in particular made of a plastics material. The housing 26 comprises a lower housing part 28 which is, for example, of trough-like configuration. The lower housing part 28 has a bottom 30 at the edge of which is seated a circumferential wall 32 protruding beyond the bottom 30. The bottom 30 and the wall 32 are in particular formed in one piece. An interior space 33 is formed between the bottom 30 and the wall 32.

The housing 26 further comprises an upper housing part 34 which is placed on top of the lower housing part 28. To this end, the wall 32 is of stepped configuration having a contact face 36 for contact with the upper housing lid 34. The upper housing lid 34 is correspondingly adapted to the shape of the wall 32.

The upper housing part 34 has through-openings 38. These are aligned with sleeves 40 seated, and in particular formed in one piece, on the lower housing part 28. The upper housing part 34 can be fixed to the lower housing part 28 by means of screws or the like, wherein the screws (or the like) engage in the sleeves 40 and screw heads (or the like) rest on the upper housing part 34 in the surroundings of the openings 38.

The housing 26 has a first fixing device 42 via which the belt holder device 10 can be fixed to the application 14 through the housing 26. The first fixing device 42 comprises a first through-recess 44 in the lower housing part 28 and a second through-recess 46 corresponding thereto in the upper housing part 34. The first through-recess 44 and the second through-recess 46 are aligned in line with each other and together form a through-opening 47 in the housing 26. A fastening element 48 can extend through the first recess 44 and the second recess 46.

A plate 50 is mounted on the housing 26 for displacement thereon. The plate 50 is in particular made of a metallic material.

The plate 50 comprises a second fixing device 52 to which the belt 12 is fixed. The fixing device 52 is in particular formed by a through-recess 54 in the plate 50. The belt 12 is looped through the recess 54, wherein for holding the belt 12 within the recess 54, the belt 12 is attached to an area overlying an area 56 near its free end. Such attachment is realized, for example, by means of stitching or adhesive bonding.

The housing 26 has a first end 58 and a second end 60 opposed thereto. The housing 26 is closed at the first end 58 via the wall 32. The housing 26 is open at the second end 60, and the plate 50 extends out of the housing 26 via the second end 60, so that the recess 54 and, with it, the belt 12 fixed thereto are located outside of the interior space 33 of the housing 26. The remaining part of the plate 50 is located inside the interior space 33.

The plate 50 has a through-recess 62 which is positioned within the housing 26 and corresponds with the first recess 44 and the second recess 46 of the housing 26. The fastening element 48 extends through the recess 62. The recess 62 has a larger length in a direction 64 between the first end 58 and the second end 60 of the housing 26 than the first recess 44 and the second recess 46 in the housing 26. The direction 64 is a direction of displacement of the plate 50 on the housing 26.

With the belt holder device 10 fixed, the fastening element 48 also extends through the recess 62. The larger length of the recess 62 in the direction 64 allows for the relative displaceability of the plate 50 to the housing 26 (within a certain length of displacement), even with the fastening element 48 extending through said recess.

The fastening element 48 also holds the plate 50. This is advantageous in case of damage, for example in case of damage to the housing 26. By means of the fastening element 48, the belt 12 is then held on the application 14 through the plate 50 even when the housing 26 is damaged or, indeed, completely destroyed.

The fastening element 48 comprises a head 66, a first area 68 adjacent thereto, and a second area 70 adjacent to the first area 68 and with an external thread 72. The first area 68 is in particular of non-threaded configuration.

The head 66 has a larger diameter than the first area 68. The first area 68 serves to extend through the opening 47. The head 66 can be brought into contact with an outer side of the housing 26 and in particular of the lower housing part 28. The fastening element 48 can be screwed to the application 14 via the external thread 72 of the second area 70. The second area 70 has a smaller cross-section than the first area 68. This causes a contact face 74 to be formed on the first area 68 at the transition to the second area 70, said contact face being in particular of annular shape. The fastening element 48 can be brought into contact with the application 14 via said contact face 74. This makes it possible to adjust the depth to which the fastening element 48 is screwed into the application 14.

When the first area 68 extends into the opening 47, it also extends through the recess 62 of the plate 50 with the displaceability thereof being enabled as has been mentioned above.

The plate 50 is of flat configuration. It extends between a bottom side 76 facing the bottom 30, and a top side 78 facing towards the upper housing part 34. The bottom side 76 and the top side 78 are in particular parallel to each other. Preferably, the distance between the bottom side 76 and the top side 78 is the same over the entire length of the plate 50.

The plate 50 has opposing lateral bays 80a, 80b which are adapted to the corresponding sleeves 40 in order not to impede the plate's displaceability along the length of displacement by collision with sleeves 40.

The plate 50 has a further through-recess 82 between the recess 62 and the recess 54. A web 84 is seated, and is in particular seated in one piece, on the lower housing part 28 near the second end 60 thereof, said web 84 having, in particular, sleeves 40. Said web 84 extends through the recess 82 and is thus positioned with a partial area thereof in the recess 82 of the plate 50. The web 84 is fixed to the bottom 30 and protrudes beyond it into the interior space 33. The recess 82 is delimited in the direction of the recess 62 by a wall 86. Seated in the recess, at a position between the wall 86 and the web 84, is a flexural spring device 88. The flexural spring device 88 is supported on the wall 86 and the web 84. The flexural spring device 88 provides a return force.

For example, if the plate 50, by the action of force on the belt 12, is pulled farther out from the housing 26, then the flexural spring device 88, by mediation of the web 84, is elastically compressed. When the force ceases to act on the belt 12, the flexural spring device 88, owing to the corresponding return force, causes return movement of the plate 50 until the plate 50 contacts the housing 26 or a part of the housing. For example, corresponding contact is caused by the web 84 contacting a wall 90 of the recess 82 opposite the wall 86.

The flexural spring device 88 is preferably formed by a single flexural spring or a single pack of flexural springs. The flexural spring device 88 has a middle region 92 on which are seated, in particular in one piece, a first wing 94 and a second wing 96. The first wing 94 extends transversely to the direction 64 towards one side, and the second wing 96 extends towards the other side. The first wing 94 and the second wing 96 are elastically held at the middle region 92. A flexural axis 97 (FIG. 6) for the elastic bendability of each of the first wing 94 and the second wing 96 relative to the middle region 92 is transverse and in particular perpendicular to the direction 64.

The flexural spring device 88 is of symmetric configuration with respect to its middle region 92, i.e. the first wing 94 and the second wing 96 are arranged and configured symmetrically.

Figure 3:
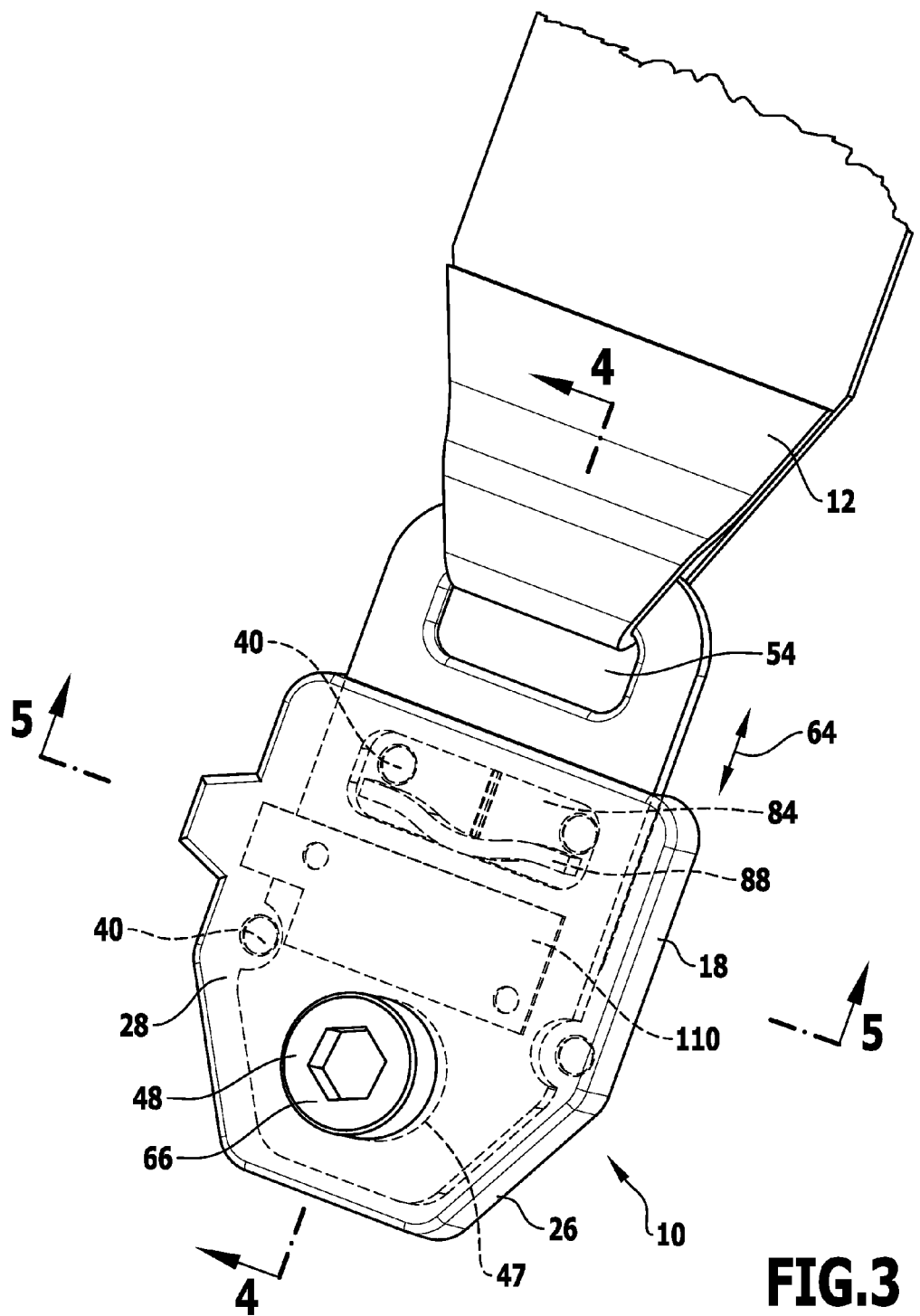
FIG. 3 is an enlarged view of detail A of FIG. 1.
Figure 4:
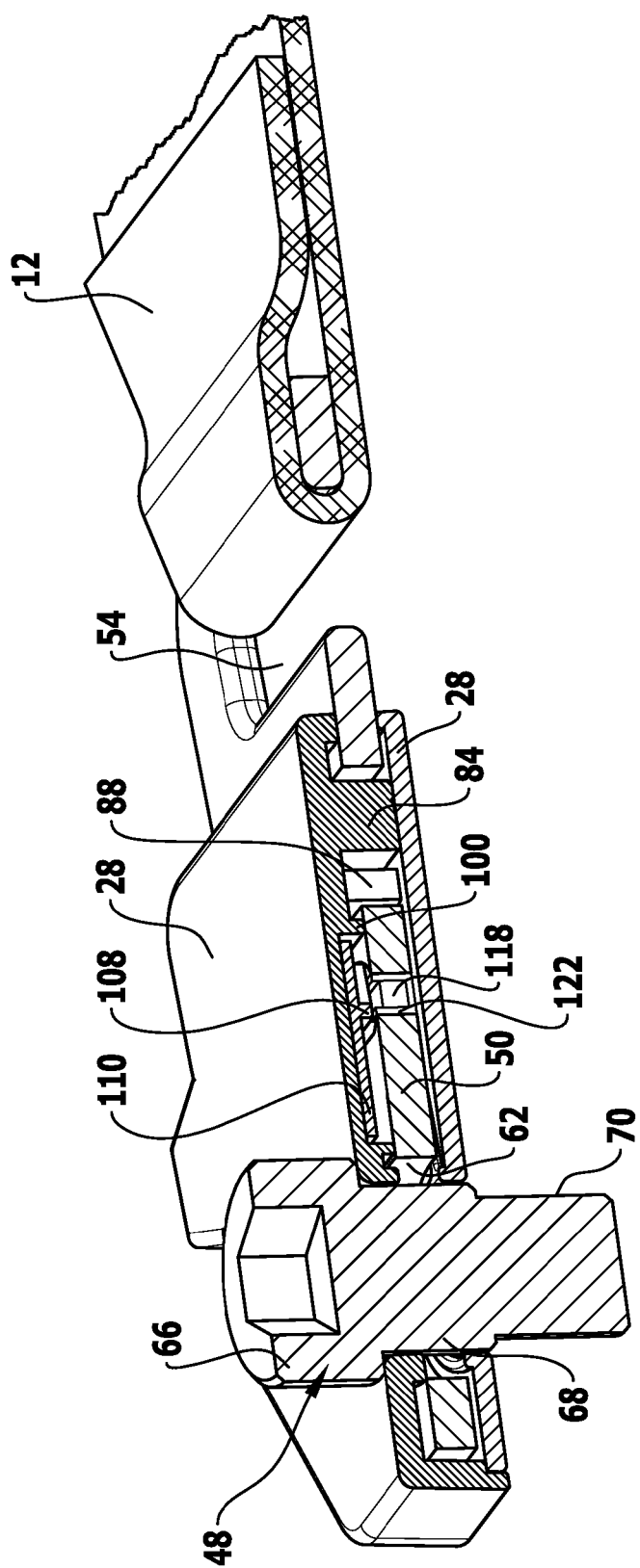
FIG. 4 is a sectional view along line 4-4 of FIG. 3.
Figure 5:
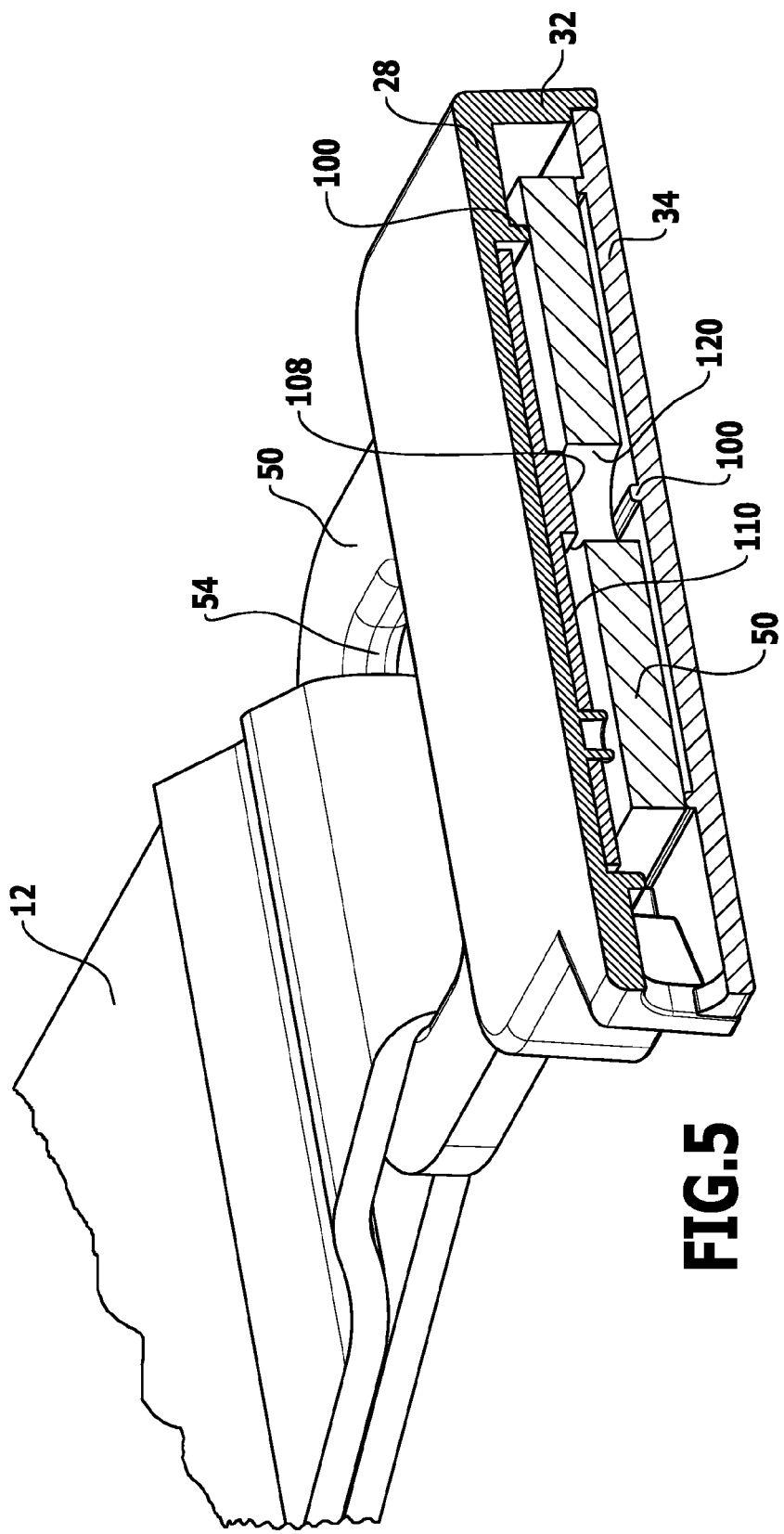
FIG. 5 is a sectional view along line 5-5 of FIG. 3.
Figure 6:
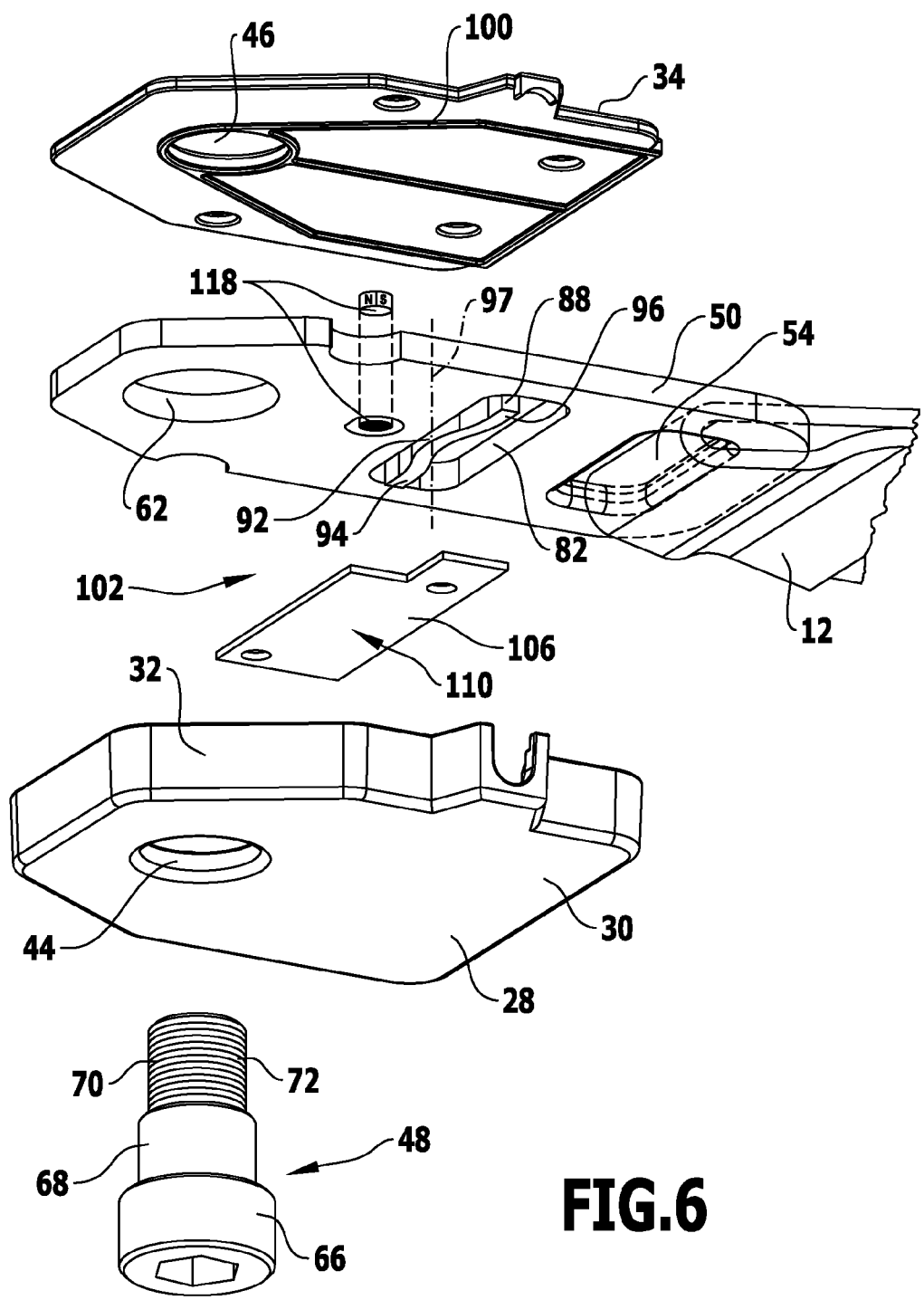
FIG. 6 is an exploded view of the belt holder device shown in FIG. 3.
Figure 7:
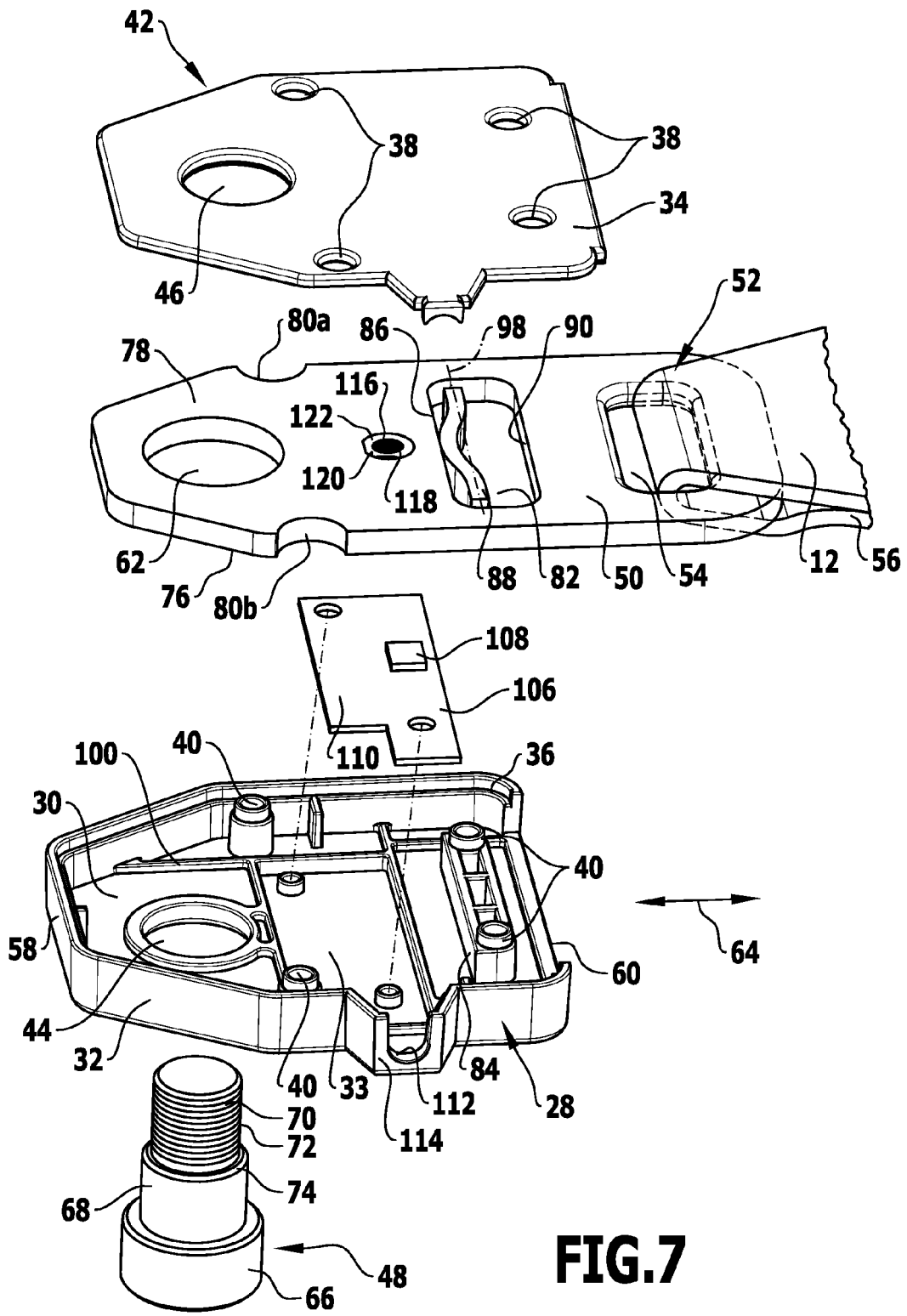
FIG. 7 is a further exploded view of the belt holder device shown in FIG. 3.

The flexural spring device 88 may be of curved configuration relative to the first wing 94 and the second wing 96, as shown for example in FIG. 3. In principle, it is also possible for the flexural spring device 88 to be of rectilinear configuration (in particular without force biasing).

The flexural spring device 88 is supported on the wall 86 via its middle region 92. The first wing 94 and the second wing 96 are supported on the web 84, wherein a location of support of the first wing 94 and a location of support of the second wing 96 are spaced apart from each other in a direction 98 transverse to the direction 64 and are also spaced apart from a location of support of the middle region 92 in said direction 98.

The flexural spring device 88 has its largest longitudinal extension in the direction 98 perpendicular to the direction 64. The longitudinal extension of the flexural spring device 88 in the direction 64 is considerably smaller than its extension in the direction 98.

The flexural spring device 88 is made of a metallic material. It may also be made of a plastics material and in particular of a fibre-reinforced plastics material.

For example, it is also possible for the flexural spring device 88 to be made of a polymeric elastomer.

The lower housing part 28 and the upper housing part 34 each have slide rails 100 arranged thereon on which the plate 50 is mounted for sliding displacement. The slide rails 100 are in particular integrally formed in one piece on the corresponding housing part 28 or 34.

It is possible for the slide rails 100 to be configured as reinforcement ribs for the corresponding housing part.

The belt holder device 10 comprises a transmitter-sensor device, generally indicated at 102, which allows the relative position of the plate 50 to the housing 26 to be determined and a corresponding signal to be transmitted for example to a superimposed control device. This is indicated in FIG. 1 by a line 104. The signal is characteristic of the belt tension.

The transmitter-sensor device 102 comprises a sensor unit 106 having (at least) one sensor 108. Preferably, the sensor unit 106 comprises at least one circuit board 110 on which the sensor 108 is seated. The circuit board 110 is fixed to the lower housing part 28, for example by means of screws. It is positioned between the first recess 44 and the web 84. The sensor 108 is located at a central plane of the belt holder body 18.

The housing 26, at a side thereof, has a recess 112 which is, for example, arranged at a connection piece 114. The circuit board 110 is partially arranged at the connection piece 114. The recess 112 can be used to connect a plug or to lead out a cable via the line 104 which is adapted to transmit the corresponding sensor signal to a control device or the like. The connection piece 114 receives a terminal on the circuit board 110.

In particular, a magnet 118 and preferably a permanent magnet is provided as a transmitter 116.

Said magnet 118 is seated in a recess 120 which is located between the recess 62 and the recess 82. The magnet 118 is surrounded by a magnetically insulating enclosure 122 which may be, for example, in the form of a sleeve.

The magnet 118 is, for example, attached to the recess 120 by adhesive bonding or press-fit mounting.

The magnet 118, like the sensor 108, is located in a central plane of the belt holder body 18 and is aligned with the sensor 108. The sensor 108 is correspondingly magnetic field sensitive. The sensor 108 is, for example, a Hall sensor.

The transmitter 116 is integrated in the plate 50.

The magnet 118 is preferably a bar magnet and is, for example, of cylindrical or cube-shaped configuration. It does not protrude beyond the top side 78 of the plate 50. It is either flush with or countersunk in the top side 78. In this connection, it is, for example, possible for the recess 120 to be of the blind hole type with its opening formed from the bottom side 76.

In principle, it is possible for the magnet 118 to protrude beyond the bottom side 76 in the direction of the bottom 30. However, advantageously, it is provided for it not to protrude beyond said bottom side 76 and to be, for example, flush with or countersunk in the bottom side 76.

In configuring the magnet 118 as a bar magnet, north pole and south pole succeed each other in a direction of succession. Said direction of succession is parallel to the direction 64 (refer to FIG. 6).

Figure 8:
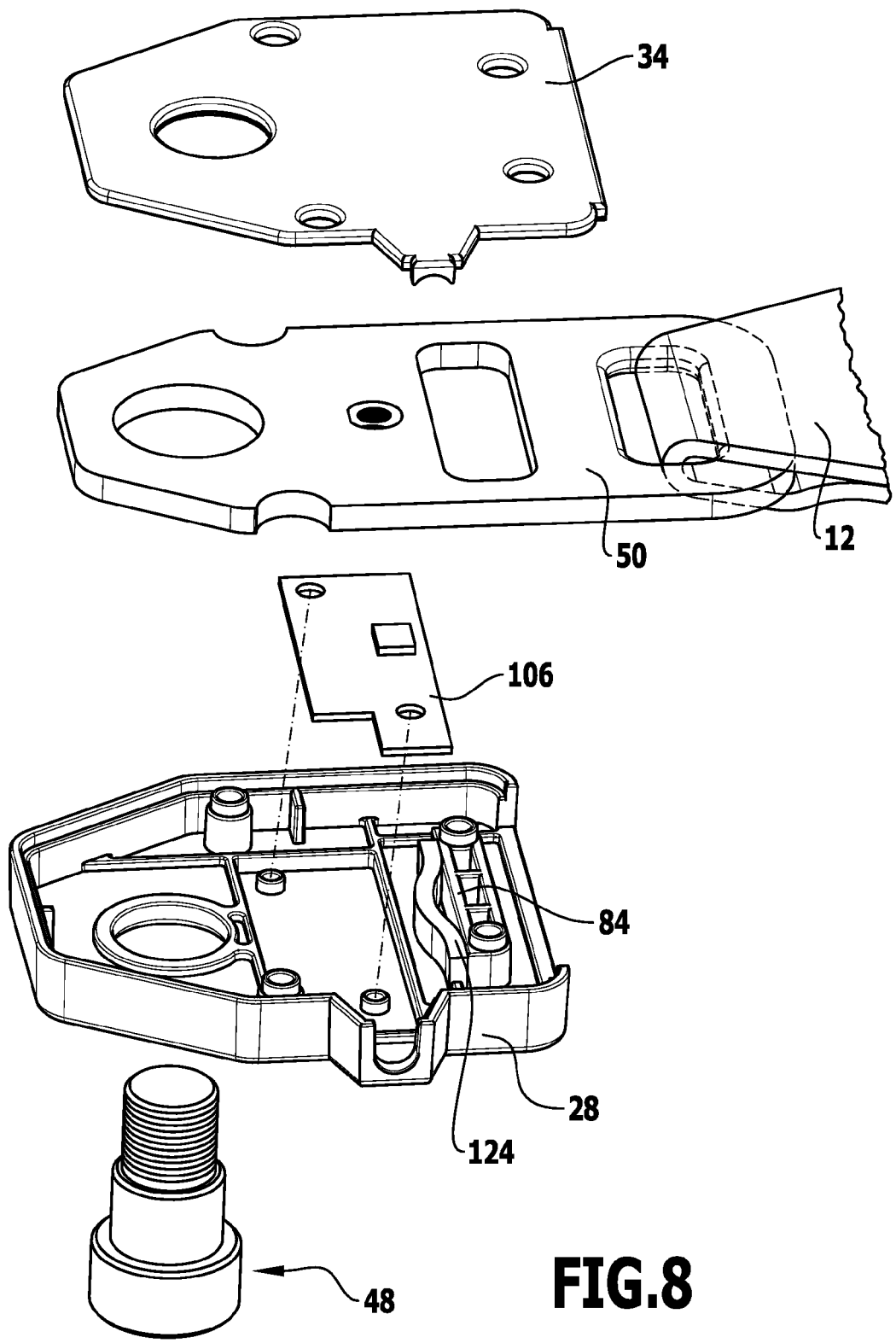
FIG. 8 is an exploded view of a further exemplary embodiment of a belt holder device in accordance with the invention.

In a further exemplary embodiment, schematically shown in FIG. 8, a flexural spring device 124 is provided which is not an element separate from the housing 26 but is integrally formed on the housing 26 and in particular on the web 84. In this instance, the flexural spring device 124 is made of a plastics material and in particular of a fibre-reinforced plastics material, with a connection to the web 84 existing at the locations of support on the web 84. Said connection is preferably made in one piece and/or in particular by substance-to-substance bonding.

Otherwise, the belt holder device is constructed as described above in connection with the belt holder device 10.

The belt holder device 10 is constructed using a minimized number of components. The transmitter 116 (magnet 118) is integrated in the plate 50 without an added magnet carrier or the like.

By providing the flexural spring device 88 or 124 which is supported in the recess 82, a very compact construction combined with ease of assembly is obtained for the belt holder device 10. The belt holder device 10 can be implemented with small length and height dimensions.

Figure 9:
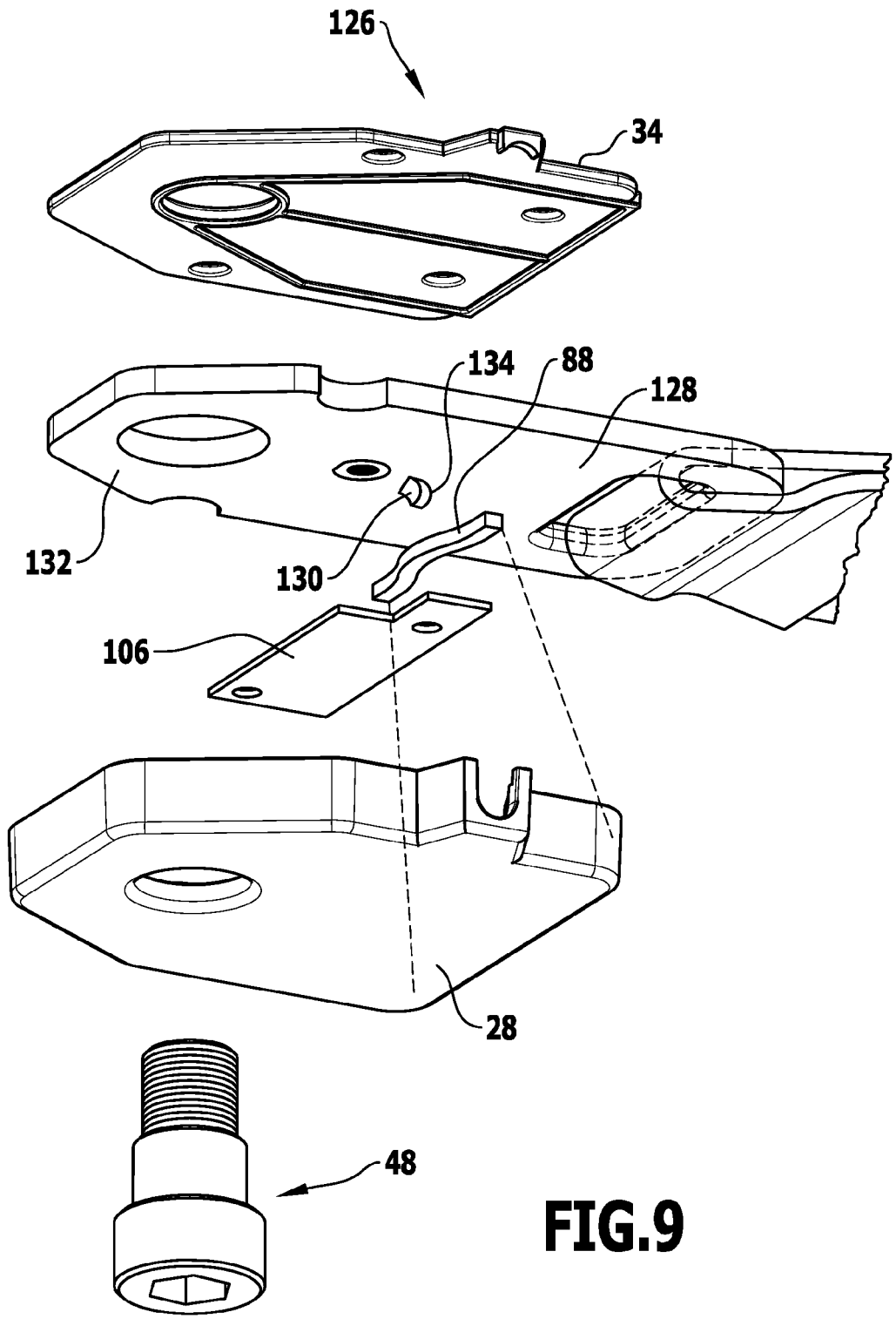
FIG. 9 is an exploded view of a further exemplary embodiment of a belt holder device in accordance with the invention.

In a further exemplary embodiment, shown in FIG. 9 and indicated at 126, a plate 128 is provided which, in lieu of the recess 82 for supporting the flexural spring device 88, has a pin 130 which protrudes beyond a bottom side 132 of the plate 128 facing towards the lower housing part 28 and which provides a corresponding contact face 134 for contact with the flexural spring device.

Correspondingly, the lower housing part 28 has a web (not shown in FIG. 9) the flexural spring device 88 can be supported on, in which case the web may also provide a guide face (sliding face) for the plate 128.

The pin 130 is in particular integrally formed in one piece on the plate 128.

Otherwise, the belt holder device 126 functions as described above.

In the belt holder device in accordance with the invention, the transmitter-sensor device 102 functions in a non-contact manner, i.e. the relative position of the transmitter 116 to the sensor 108 and thus the relative position of the plate 50 or 128 at the housing 26 can be determined without contact between the transmitter 116 and sensor 108.

The corresponding data may, for example, be used in connection with an airbag control.

The invention claimed is:

1. A belt holder device, comprising:
    a housing having a first fixing device, wherein the first fixing device comprises an opening in the housing through which a fastening element is adapted to extend;
    a plate having a second fixing device and being mounted on the housing for displacement in a displacement direction, the plate having a corresponding opening having a length in the direction of displacement that is larger than that of the opening in the housing;
    wherein the belt holder device is held on an application via one of the fixing devices and a belt is held on the other fixing device;
    a transmitter-sensor device which is arranged in the housing and by means of which a relative position of the plate to the housing is determinable; and
    a spring device via which the plate is supported on the housing and which provides a return force;
    wherein the spring device is formed by a flexural spring device, the spring device having a flexural axis for elastic bendability being transverse to the plate;
    wherein the transmitter-sensor device is integrated in the plate;
    wherein the transmitter-sensor device is arranged in a recess of the plate and does not protrude beyond the plate; and
    wherein the transmitter-sensor device in the recess is a magnet and is surrounded by a magnetically insulating enclosure.

2. The belt holder device in accordance with claim 1, wherein the flexural spring device has a middle region, a first wing and a second wing, each of the first wing and the second wing being arranged at and being elastically bendable with respect to the middle region.

3. The belt holder device in accordance with claim 2, wherein the flexural spring device is supported via its middle region on one of the housing and the plate and the first wing and the second wing are supported on the other of the housing and the plate.

4. The belt holder device in accordance with claim 1, wherein the flexural spring device is made of a plastics material.

5. The belt holder device in accordance with claim 4, wherein the flexural spring device is made of a plastics material which is fibre reinforced.

6. The belt holder device in accordance with claim 4, wherein the flexural spring device is integrally formed on the housing.

7. The belt holder device in accordance with claim 6, wherein the flexural spring device is integrally formed in one piece, on the housing.

8. The belt holder device in accordance with claim 1, wherein at least one pin element for supporting the flexural spring device is arranged at the plate.

9. The belt holder device in accordance with claim 1, wherein the plate has a recess, the flexural spring device being supported on a wall delimiting the recess.

10. The belt holder device in accordance with claim 1, wherein the housing has a web or a wall on which the flexural spring device is supported.

11. The belt holder device in accordance with claim 10, wherein the web extends into a recess of the plate.

12. The belt holder device in accordance with claim 1, wherein the housing has a lower housing part and an upper housing part.

13. The belt holder device in accordance with claim 12, wherein slide rails for the plate are integrally formed on at least one of the lower housing part and the upper housing part.

14. The belt holder device in accordance with claim 12, wherein slide rails for the plate are integrally formed in one piece, on at least one of the lower housing part and the upper housing part.

15. The belt holder device in accordance with claim 1, wherein the transmitter-sensor device is a magnet and has a cylindrical or cube-shaped configuration.

16. The belt holder device in accordance with claim 1, wherein the plate has a top side and a bottom side, the bottom side facing towards a sensor and the transmitter-sensor device not protruding beyond the top side.

17. The belt holder device in accordance with claim 1, wherein the plate has a top side and a bottom side, the bottom side facing towards a sensor and the transmitter-sensor device not protruding beyond the top side and, the transmitter-sensor device not protruding beyond the bottom side.

18. The belt holder device in accordance with claim 1, wherein the fastening element which is adapted to extend through the opening in the housing has a first area adapted to be positioned in the opening of the housing and a second area provided with a thread, the first area having a larger cross-section than the second area.

19. A belt holder device, comprising:
    a housing having a first fixing device;
    a plate having a second fixing device and being mounted on the housing for displacement in a displacement direction, wherein the plate has a top side and a bottom side;
    wherein the belt holder device is held on an application via one of the fixing devices and a belt is held on the other fixing device;
    a transmitter-sensor device which is arranged in the housing and by means of which a relative position of the plate to the housing is determinable, wherein the bottom side of the plate faces towards a sensor; and
    a spring device via which the plate is supported on the housing and which provides a return force;
    wherein the spring device is formed by a flexural spring device, the spring device having a flexural axis for elastic bendability being transverse to the plate;
    wherein the transmitter-sensor device is integrated in the plate;
    wherein the transmitter-sensor device is arranged in a recess of the plate and does not protrude beyond the top side of the plate; and
    wherein the transmitter-sensor device in the recess is a magnet and is surrounded by a magnetically insulating enclosure.

20. A belt holder device, comprising:
    a housing having a first fixing device;
    a plate having a second fixing device and being mounted on the housing for displacement in a displacement direction, wherein the plate has a top side and a bottom side;
    wherein the belt holder device is held on an application via one of the fixing devices and a belt is held on the other fixing device;
    a transmitter-sensor device which is arranged in the housing and by means of which a relative position of the plate to the housing is determinable, wherein the bottom side of the plate faces towards a sensor; and
    a spring device via which the plate is supported on the housing and which provides a return force;
    wherein the spring device is formed by a flexural spring device, the spring device having a flexural axis for elastic bendability being transverse to the plate;

wherein the transmitter-sensor device is integrated in the plate;
wherein the transmitter-sensor device is arranged in a recess of the plate, and does not protrude beyond the top side of the plate and does not protrude beyond the bottom side of the plate; and
wherein the transmitter-sensor device in the recess is a magnet and is surrounded by a magnetically insulating enclosure.

* * * * *